3,257,437
PREPARATION OF AMIDES OF HYDROXY NON-TERTIARY AMINES

Paul Lindner, Evanston, Ill., assignor to Witco Chemical Company, Inc., New York, N.Y., a corporation of Delaware
No Drawing. Filed Nov. 6, 1962, Ser. No. 235,827
15 Claims. (Cl. 260—404)

My invention relates to a new and highly advantageous method for the preparation of higher molecular weight monocarboxylic acid amides of hydroxy primary and secondary amines, particularly higher molecular weight fatty acid amides of hydroxy-alkyl primary and secondary amines.

Higher molecular weight monocarboxylic acid amides of hydroxy primary and secondary amines, exemplified, especially, by $C_8$ to $C_{20}$ fatty acid amides of monoethanolamine, diethanolamine and mono-isopropanolamine, are in wide commercial usage in the detergent and related fields. These amides are conventionally formed by condensing a higher molecular weight monocarboxylic acid, or an ester thereof, for instance, lauric acid or myristic acid or coconut oil fatty acids, or coconut oil, with monoethanolamine or diethanolamine or other hydroxy primary or secondary amines, at elevated temperatures, very commonly, in certain of such condensation reactions, at temperatures of the order of 150 to 170 degrees C. for a period of several hours. In such condensation reactions, while it is commonly desired that the end condensation product contain predominantly amides of the higher molecular weight monocarboxylic acid with the selected hydroxy primary and secondary amines, the said condensation products invariably contain substantial proportions of other materials as, for instance, esters, ester-amides, soaps, and unreacted hydroxy amine. The amide contents of such condensation products vary but, very commonly, are of the approximate order of 60 to 67%. The hydroxy primary and secondary amines are commonly reacted, depending upon properties desired, with the higher molecular weight monocarboxylic or fatty acids in mol ratios of about 1 to 2 of said amines to 1 of said acids.

Various methods have been utilized, in accordance with prior art teachings, to attempt to bring about the formation of condensation products in which the amide contents are appreciably higher than what is conventionally produced by following the procedures described above. One of such approaches has been to allow the condensation product, after completion of the condensation reaction proper, to age, within specified temperature ranges, for prolonged periods of time, commonly of the order of 16 hours to several days. Another procedure which has come into appreciable use in accordance with teachings in the art involves carrying out the condensation reaction, for example, between approximately equal mol weights of diethanolamine and the higher fatty acid material by utilizing the latter in a form of a methyl ester, for instance, methyl laurate or methyl myristate or methyl esters of coconut oil fatty acids, and carrying out the condensation reaction in the presence of a catalyst such as an alkali metal alkoxide or alcoholate, for instance, sodium methylate, the reaction being carried out under substantially anhydrous conditions. Such condensation products, because of their high contents of amides, for instance of the order of 90% of diethanolamides, are commonly referred to as superamides or high-activity amides.

Another procedure which has been proposed involves reacting higher fatty acid triglycerides, such as coconut oil, with a lower monohydric alcohol, such as methanol, in the presence of an alkali metal alkoxide, with hydroxy primary or secondary amines such as monoethanolamine or diethanolamine; and still another suggested procedure involves heating a mixture of a primary or secondary alkanolamine, such as monoethanolamine or diethanolamine, with a sodium methoxide catalyst to a temperature of about 55 to 75 degrees C., and gradually adding to said mixture a cold fatty acid ester, such as methyl laurate or coconut oil, while maintaining the reaction mixture in a vacuum, for instance, of the order of 29 inches of mercury.

The foregoing, and other methods as well, suffer a number of significant disadvantages. These may, in general, be described as requiring relatively long reaction periods; or after-treatments, generally over prolonged periods of time, in order to bring about the production in the final condensation products of relatively high contents of amides; or the maintenance of relatively high vacuum conditions during the reaction; or, in certain cases, the utilization of relatively high temperatures in order to complete the reaction to a sufficient extent to result in the production of condensation products having relatively high amide contents. Possibly the best presently known procedure for the production of high amide content condensation products of the type here involved is that wherein an hydroxy primary or secondary amine, such as diethanolamine, is reacted with a methyl ester of a higher molecular weight fatty acid in the presence of a sodium methylate catalyst. Here, however, the reaction periods are still relatively substantial, particularly if low temperatures are utilized in the reaction process, although amide contents of the order of 90% are readily obtainable.

I have discovered, in accordance with my present invention, that exceptionally high contents of amides can be obtained by a method in which an hydroxy primary or secondary amine is condensed with an ester of a higher molecular weight monocarboxylic acid, particularly a higher molecular weight fatty acid, the condensation reaction being carried out in the presence of an alkali metal alkoxide or other catalyst, as hereafter pointed out, and an appreciable amount of a preformed amide of an hydroxy amine, generally of the order of at least 10% and better still from 20 to 30%, by weight of the hydroxy primary or secondary amine utilized in the carrying out of the condensation reaction.

The preformed amide of the hydroxy primary or secondary amine may be the same as the amide of the hydroxy primary or secondary amine which is sought to be produced in accordance with the condensation reaction or it may be of different character. Thus, for instance, if the method is intended to produce the amide of diethanolamine and lauric acid (lauric acid diethanolamide), the preformed amide utilized in the reaction may be said amide, or it may be an entirely different amide as, for instance, the oleic acid amide of mono-isopropanolamine. In such cases where the preformed amide used as one of the ingredients in the reaction is different from the amide intended to be produced by the method of the invention, the final condensation or reaction product will, of course, contain a mixture of both amides.

The mol ratio of the higher molecular weight fatty acid (contained in the ester thereof used in the method of the present invention) to the hydroxy primary or secondary amine is variable but it generally is advantageous to operate within the range of 1:1 to 1:2 and particularly in the range of 1:1 to 1:1.3.

Condensation products having high contents of amides, for instance, 80% or 85%, as well as in excess of 90%, are readily producible, the remainder of the condensation product usually comprising small proportions of unreacted hydroxy amine, ester-amine, soap and unreacted ester.

The essential reactants used, in carrying out the novel method of my invention, comprising a preformed amide of an hydroxy primary or secondary amine with a higher molecular weight monocarboxylic acid, an hydroxy primary or secondary amine, an ester of a higher molecular weight monocarboxylic acid, particularly a methyl ester thereof, and a catalyst, especially sodium methylate. In certain cases, for enhancement of the solubility of the mixture of the hydroxy primary or secondary amine, the catalyst and the ester of the higher molecular weight monocarboxylic acid, it is desirable to incorporate in the reaction mixture a lower molecular weight alcohol containing from 1 to 5 carbon atoms, such as methanol, ethanol, propanol, isopropanol, butanol, isobutanol or pentanols, especially methanol, but such alcohol is not ordinarily an essential ingredient of the reaction mixture if said mixture is sufficiently liquid at the reaction temperature utilized.

In the practice of my invention, the addition of the ester of the higher molecular weight monocarboxylic acid, for instance, methyl laurate, to the system or solution of the hydroxy primary or secondary amine, catalyst, and preformed hydroxy primary or secondary amine amide, with or without the free lower alcohol, as may be necessary, is effected at such a rate as to maintain a single phase system, to wit, a clear or essentially clear solution, in which the hydroxy primary or secondary amine is always present in a substantial excess over the introduced ester of the higher molecular weight monocarboxylic acid. The result is that the more stable and desired amides of the hydroxy primary or secondary amines are produced at low temperature as distinguished from the production of an ester-amide linkage with the said hydroxy amines. At the same time, the formation of the amide and the liberation of the alcohol from the ester of the higher molecular weight monocarboxylic acid, during the course of the reaction, results in an increase of the solvent base thereby permitting increased speed of the addition of the higher molecular weight monocarboxylic acid ester to the reaction mixture without adversely affecting the desired amidification reaction. My invention lends itself to a continuous method for the production of $C_8$–$C_{20}$ monocarboxylic acid amides of hydroxy primary and secondary amines.

The temperature at which the condensation reaction is carried is in the range of room temperature, preferably 30 degrees C., to 50 degrees C. The reaction time necessary to form the amides, in accordance with the practice of the method of my invention, will vary somewhat but, in general, such reaction periods will range from about 1 to 3 hours. The higher molecular weight monocarboxylic acid ester, for instance, methyl laurate, is added, over a short period of time, to the mixture of the other ingredients, generally speaking, gradually or in increments, and, as the reaction proceeds, the speed of the gradual or incremental additions can be accelerated, the conditions being such that the reaction mixture remains clear and constitutes a single phase, a substantial excess of the hydroxy primary or secondary amine being maintained to essentially the end of the reaction period.

It is especially advantageous to carry out the method of the invention at atmospheric pressure and to maintain the methanol or other lower molecular weight alcohol which is added or which may be formed during the reaction present in the reaction mixture until at least the major phase of the amidification reaction has been completed. By so proceeding, the methanol or other lower molecular weight alcohol plays a definite role in inhibiting any tendency of ester formation to occur between the hydroxy primary or secondary amine and the higher molecular weight monocarboxylic acid ester.

In carrying out the method of my invention, while the essential condensation reaction in which by far the major phase of the amidification has been completed is conducted at a temperature of the order of room temperature to 50 degrees C., it is sometimes advantageous to finish the reaction to the extent desired at a somewhat higher temperature for a short period of time. Since the amidification reaction has been mainly finished, the small excess of free hydroxy primary or secondary amine becomes a large excess in relation to the remaining unreacted higher molecular weight monocarboxylic acid ester, thus minimizing the possibility of ester-amide formation.

The hydroxy primary and secondary amines which, for convenience, are denoted as hydroxy non-tertiary amines, utilized in the practice of my invention may be selected from a large number. They contain one or more amine groups having at least one replaceable hydrogen atom and may, for convenience, be called hydroxy non-tertiary amines. Illustrative examples thereof are monoethanolamine, diethanolamine, monopropanolamine, monoisopropanolamine, monobutanolamine, dibutanolamine, monoisobutanolamine, glycerol monoamine, glycerol diamine, diglycerol monoamine, monoethyl ethanolamine, monoisopropylethanolamine, monopentanolamine, dipentanolamine, monohexanolamines, dihexanolamines, monooctanolamines, monolaurylolamine, cyclohexyl ethanolamine, 1-hydroxy-ethylamino-2-methoxy-propan-ol-3, hydroxyethyl ethylene diamine, hydroxyethyl propylene tetraamine; 1-amino-2,3-propanediol; 1-amino-2,3-propanol; and mixtures of any two or more thereof. Of especial utility are hydroxy-alkyl non-tertiary amines having from 2 to 4 carbon atoms in each alkyl radical as, for example, monoethanolamine, diethanolamine and monoisopropanolamine.

The esters of the higher molecular weight ($C_8$–$C_{20}$) monocarboxylic acids utilized in the method of the present application may be selected from extensive groups of known examples thereof. Of especial utility are the methyl esters of $C_8$–$C_{18}$ fatty acids such as methyl caprylate, methyl caprate, methyl laurate, methyl myristate, methyl palmitate, methyl oleate, methyl stearate, methyl linoleate, and methyl esters of mixed fatty acids derived from triglyceride oils and fats or by synthetic processes as, for instance, through the oxidation of hydrocarbons, particularly methyl esters of $C_{12}$–$C_{14}$ fatty acids or mixtures containing predominantly $C_{12}$–$C_{14}$ fatty acids. Triglyceride oils and fats such as coconut oil, palm kernel oil, babassu oil, cottonseed oil, soya bean oil, corn oil, peanut oil, lard, and tallow represent other commercial sources of esters which can be used in the practice of the method of my invention. Other esters of $C_8$–$C_{20}$ monocarboxylic acids can be used such as the ethyl, propyl and isopropyl alcohol esters but for commercial and other reasons their use is not preferred.

The catalysts employed in accordance with the present invention are most advantageously the alkali metal alkoxides which are preferably added as such to the reaction mixture but which may be formed in situ in accordance with known technique. Such catalysts have been used, as indicated previously, in various amidation reactions and no novelty is per se broadly claimed as to such use. The alkali metal alkoxides used pursuant to the present invention are those containing from 1 to 5 carbon atoms and include the sodium, potassium and lithium alkoxides derived from monohydric alcohols such as methanol, ethanol, propanol, isopropanol, butanol, isobutanol, and pentanols. Especially satisfactory, as stated above, is sodium methylate.

In place of or in conjunction with the alkali metal alkoxides, other catalysts which can be utilized are the alkali metal amides, such as sodium amide, potassium amide and lithium amide; and the alkali metal aminoalkoxides containing from 1 to 5 carbon atoms, the latter being derived, by way of example, by the interaction of an alkali metal such as sodium, potassium or lithium with an hydroxy amine such as monoethanolamine, diethanolamine, monoisopropanolamine or other hydroxy amines, or by dehydration of an alkali metal hydroxide solution in the hydroxy amine.

While the amount of the catalyst employed is somewhat variable, for best results it should be in the range of from 1 to 5 grams, and should ordinarily not exceed about 5 grams, and more advantageously should lie in the range of 2.5 to 3.5 grams, in the case of sodium or other alkali metal methylate or methoxide, per gram mol of the ester of the long chain monocarboxylic acid, particularly the methyl esters of the $C_8$–$C_{20}$ fatty acids, utilized in the reaction. The use of excessive amounts of the catalyst tends to cause instability especially of secondary amine linkages.

In order that the full details of my invention will be even better appreciated, the following examples are provided. These examples are illustrative of the practice of the method of my invention and it will be understood that variations may be made therein in a number of particulars without in any way departing from the fundamental prinicples and teachings provided herein. The examples, therefore, are not to be construed in any way as limitative of the scope of my invention.

Example 1

120 grams of a diethanolamide of a commercial mixture of lauric and myristic acids were placed in a reaction flask and 330.9 grams of diethanolamine (5% molar excess) and 30 grams of a 24% active sodium methylate solution in methanol were added. While maintaining said mixture at about 35 degrees C., 668.1 grams (3 mols) of the methyl ester of a mixture of lauric and myristic acids were added thereto, at atmospheric pressure, in a slow stream or in small increments so as to keep the reaction mixture clear. Approximately one-third of the total quantity of the methyl ester of the mixture of lauric and myristic acids was added over a period of 30 minutes, the second approximately one-third was added over a period of 20 minutes and the last approximately one-third was added over a period of 10 minutes. The final mixture was maintained for a period of 1 hour at approximately 45 degrees C. A small vacuum was then drawn on the flask and distillation was started at about 45 degrees C. and the temperature was slowly increased to 60 degrees C. while simultaneously increasing the vacuum. The distillation step took approximately 1½ hours. Note: Care should be exercised in carrying out this reaction since the material foams appreciably.

On analysis, the final condensation reaction product contained between 92 and 94% diethanolamide of the mixture of lauric and myristic acids, between 3.5 and 5% of free diethanolamine, between 1.7 and 2.5% of the ester-amine of diethanolamine with said mixture of lauric and myristic acids, and from 0.5 to 1% soap.

Example 2

A mixture was initially made of 100 grams of oleic acid diethanolamide (80% active), 105 grams of diethanolamine, and 30 grams of a 24% sodium methylate solution in methanol. To the resulting solution, which was clear, there were added slowly, over a period of 20 minutes at atmospheric pressure, while maintaining clarity during the addition, 307 grams of methyl oleate, the condensation reaction being carried out at a temperature of 27 to 30 degrees C. After about 3 hours of mixing at 30 degrees C., the amidification reaction had gone to substantial completion, the free diethanolamine content measuring about 3.5%.

Example 3

A mixture was initially made containing 165.4 grams (1.575 mols) diethanolamine, 20.3 grams of a 24% solution of sodium methylate in methanol, 168 grams of a previously prepared 89% diethanolamide of stearic acid, and 20 grams of methanol. This mixture, heated to a temperature of about 45 degrees C., formed a clear solution. There were then added thereto, over a period of about an hour, at atmospheric pressure, 429 grams (1.5 mols) of a methyl ester of a commercial mixture of stearic and palmitic acids. The mixture, after the completion of the addition, was maintained for 1 hour at about 45 degrees C. at which time a sample removed for analysis showed that the reaction had proceeded to about 85% of completion. After distilling off the methanol under reduced pressure at about 60 degrees C., the amidification reaction had gone to 92% completion, the content of free diethanolamine being 3.75%.

Example 4

To a solution of 115.5 grams of diethanolamine and 10 grams of a 24% sodium methylate in methanol in 40 grams of a diethanolamide of a 70/30 lauric/myristic acid (containing 94% amide), 218 grams of Cochin coconut oil were added slowly over a period of 2 hours, at atmospheric pressure, while maintaining the reaction mixture in the range of 36 to 40 degrees C. The final reaction product contained 92% of the theoretical amounts of the diethanolamides of the Cochin coconut oil fatty acids.

Example 5

The method described in Example 1 is carried out except that (1) 80 grams of methanol are added to the reaction mixture prior to the addition of the methyl ester of the lauric and myristic acids, (2) in place of the diethanolamide of the commercial mixture of lauric and myristic acids, there are utilized 120 grams of a monoethanolamide of a commercial mixture of lauric and myristic acids; and (3) in a place of the 330.9 grams of diethanolamine, there are utilized 192 grams of monoethanolamine.

Example 6

The method described in Example 1 is carried out except that (1) 40 grams of methanol are added to the reaction mixture prior to the addition of the methyl ester of the lauric and myristic acids, (2) in place of the diethanolamide of the commercial mixture of lauric and myristic acids, there are utilized 120 grams of a monoisopropanolamide of a commercial mixture of lauric and myristic acids; and (3) in place of the 330.9 grams of diethanolamine, there are utilized 236 grams of monoisopropanolamine.

What I claim as new and desire to protect by Letters Patent of the United States is:

1. A method of preparing $C_8$–$C_{20}$ monocarboxylic acid amides of hydroxy non-tertiary amines which comprises forming an essentially clear solution of a $C_8$–$C_{20}$ monocarboxylic acid amide of an hydroxy non-tertiary amine, an hydroxy non-tertiary amine, and a catalyst selected from the group consisting of alkali metal alkoxides containing from 1 to 5 carbon atoms, alkali metal amides and alkali metal aminoalkoxides containing from 1 to 5 carbon atoms, and gradually adding to said solution, at a temperature within the range of about room temperature to 50 degrees C., an ester of $C_8$–$C_{20}$ monocarboxylic acids while maintaining the reaction mixture substantially clear until said hydroxy non-tertiary amine is converted substantially to amides of the $C_8$–$C_{20}$ monocarboxylic acids.

2. A method of preparing $C_8$–$C_{20}$ fatty acid amides of hydroxy-alkyl non-tertiary amines in which the alkyl radicals contain from 2 to 4 carbon atoms which comprises forming an essentially clear solution of a $C_8$–$C_{20}$ fatty acid amide of said hydroxy-alkyl non-tertiary amine, said hydroxy-alkyl non-tertiary amine, and a catalyst selected from the group consisting of alkali metal alkoxides containing from 1 to 5 carbon atoms, alkali metal amides and alkali metal aminoalkoxides containing from 1 to 5 carbon atoms, and gradually adding to said solution, at a temperature within the range of about 30 to 50 degrees C., a methyl ester of $C_8$–$C_{20}$ fatty acids while maintaining the reaction mixture substantially clear until said hydroxy-alkyl non-tertiary amine is converted substantially to the $C_8$–$C_{20}$ fatty acid amide thereof.

3. A method in accordance with claim 2, wherein the mol ratio of the $C_8$–$C_{20}$ fatty acids present in said methyl ester to the hydroxy-alkyl non-tertiary amine is from 1:1 to 1:1.3.

4. A method in accordance with claim 2, in which the speed of the gradual addition of the methyl ester of the $C_8$–$C_{20}$ fatty acid is accelerated as the reaction proceeds.

5. A method of preparing diethanolamides of $C_8$–$C_{20}$ fatty acids which comprises forming an essentially clear solution of a diethanolamide of $C_8$–$C_{20}$ fatty acids, diethanolamine, and sodium methylate, and gradually adding to said solution, at atmospheric pressure and at a temperature within the range of about room temperature to 50 degrees C., a methyl ester of $C_8$–$C_{20}$ fatty acids while maintaining the reaction mixture substantially clear until said diethanolamine is converted substantially the diethanolamides of said $C_8$–$C_{20}$ fatty acids.

6. A method in accordance with claim 5, wherein, in the initial essentially clear solution of the diethanolamide of the $C_8$–$C_{20}$ fatty acids, diethanolamine, and sodium methylate, the diethanolamide of the $C_8$–$C_{20}$ fatty acid constitutes from about 10% to 30% by weight of the diethanolamine.

7. A method of preparing diethanolamides of $C_{12}$–$C_{14}$ fatty acids which comprises forming an essentially clear solution of a diethanolamide of $C_{12}$–$C_{14}$ fatty acids, diethanolamine, and sodium methylate, and gradually adding to said solution, at atmospheric pressure and at a temperature within the range of about room temperature to 50 degrees C., a methyl ester of $C_{12}$–$C_{14}$ fatty acids while maintaining the reaction mixture substantially clear until said diethanolamine is converted substantially to the diethanolamides of the $C_{12}$–$C_{14}$ fatty acids.

8. A method in accordance with claim 7, wherein the mol ratio of the $C_{12}$–$C_{14}$ fatty acids present in said methyl ester to the diethanolamine is from 1:1 to 1:1.3.

9. A method in accordance with claim 7, wherein the amount of the sodium methylene constitutes from 1 to 5 grams per gram mol of the methyl ester of the $C_{12}$–$C_{14}$ fatty acids.

10. A method in accordance with claim 7, wherein the mol ratio of the $C_{12}$–$C_{14}$ fatty acids present in said methyl ester to the diethanolamine is from 1:1 to 1:1.3, and the amount of the sodium methylate constitutes from 2.5 to 3.5 grams per gram mol of the methyl esters of the $V_{12}$–$C_{14}$ fatty acids.

11. A method in accordance with claim 7, wherein, in the initial essentially clear solution of the diethanolamide of the $C_{12}$–$C_{14}$ fatty acids, diethanolamine, and sodium methylate, the diethanolamide of the $C_{12}$–$C_{14}$ fatty acids constitutes from about 10% to 30% by weight of the diethanolamine.

12. A method of preparing monoethanolamides of $C_8$–$C_{20}$ fatty acids which comprises forming an essentially clear solution of a monoethanolamide of $C_8$–$C_{20}$ fatty acids, monoethanolamine, and sodium methylate, and gradually adding to said solution, at a temperature within the range of about 30 to 50 degrees C., a methyl ester of $C_8$–$C_{20}$ fatty acids while maintaining the reaction mixture substantially clear until said monoethanolamine is converted substantially to the monoethanolamides of the $C_8$–$C_{20}$ fatty acids.

13. A method of preparing isopropanolamides of $C_8$–$C_{20}$ fatty acids which comprises forming an essentially clear solution of an isopropanolamide of $C_8$–$C_{20}$ fatty acids, isopropanolamine, and sodium methylate, and gradually adding to said solution, at a temperature within the range of about 30 to 50 degrees C., a methyl ester of $C_8$–$C_{20}$ fatty acids while maintaining the reaction mixture substantially clear until said isopropanolamine is converted substantially to the isopropanolamides of the $C_8$–$C_{20}$ fatty acids.

14. A method of preparing $C_8$–$C_{20}$ monocarboxylic acid amides of hydroxy non-tertiary amines which comprises providing an essentially clear solution of a $C_8$–$C_{20}$ monocarboxylic acid amide of an hydroxy non-tertiary amine, an hydroxy non-tertiary amine, an alcohol containing from 1 to 5 carbon atoms, and a catalyst selected from the group consisting of alkali metal alkoxides containing from 1 to 5 carbon atoms, alkali metal amides and alkali metal aminoalkoxides containing from 1 to 5 carbon atoms, and gradually adding to said solution, at a temperature within the range of about room temperature to 50 degrees C., an ester of $C_8$–$C_{20}$ monocarboxylic acids while maintaining the reaction mixture substantially clear until said hydroxy non-tertiary amine is converted substantially to the amides of the $C_8$–$C_{20}$ monocarboxylic acids, and then distilling off free alcohol.

15. A method of preparing diethanolamides of $C_{12}$–$C_{14}$ fatty acids which comprises forming an essentially clear solution of a diethanolamide of $C_{12}$–$C_{14}$ fatty acids, diethanolamine, methanol and sodium methylate, gradually adding to said solution, at a temperature within the range of about 30 to 50 degrees C., a methyl ester of $C_{12}$–$C_{14}$ fatty acids while maintaining the reaction mixture substantially clear until said diethanolamine is converted substantially to the diethanolamides of $C_{12}$–$C_{14}$ fatty acids, and then distilling of free methanol.

References Cited by the Examiner

UNITED STATES PATENTS

| | | | |
|---|---|---|---|
| 2,464,094 | 3/1949 | Meade | 260—404 |
| 2,844,609 | 7/1958 | Tesoro | 260—404 |
| 2,877,246 | 3/1959 | Schurman | 260—404 |
| 3,107,258 | 10/1963 | Lamberti et al. | 260—404 |

CHARLES B. PARKER, *Primary Examiner.*

JOSEPH P. BRUST, *Examiner.*

ROBERT V. HINES, ANTON H. SUTTO,
*Assistant Examiners.*